US006446116B1

(12) United States Patent
Burridge

(10) Patent No.: US 6,446,116 B1
(45) Date of Patent: *Sep. 3, 2002

(54) METHOD AND APPARATUS FOR DYNAMIC LOADING OF A TRANSPORT MECHANISM IN A MULTIPOINT DATA DELIVERY SYSTEM

(75) Inventor: Richard N. Burridge, Redwood City, CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,924

(22) Filed: Jun. 30, 1997

(51) Int. Cl.[7] .............................................. G06F 15/167
(52) U.S. Cl. ........................... 709/214; 709/202; 345/15
(58) Field of Search ................. 395/500, 701, 395/380, 200.64, 615, 200.34; 345/329; 370/94.1, 389; 364/140; 705/26; 235/375; 709/219, 224, 204, 238, 214, 200, 206, 203, 227, 221, 300, 213–215, 229, 223, 202, 222, 330; 707/10

(56) References Cited

U.S. PATENT DOCUMENTS 5,392,400 A * 2/1995 Berkowitz et al. .......... 709/200
5,425,028 A * 6/1995 Britton et al. ............. 370/94.1

(List continued on next page.)

FOREIGN PATENT DOCUMENTS

| EP | 0 713 310 | 5/1996 | ............ H04L/29/06 |
| WO | WO 95 17066 | 6/1995 | ............ H04L/29/06 |

OTHER PUBLICATIONS

Gianoutsos, W4: A World Wid Web browser with CSCW support, IEEE 1996.*
LiGong, Enclaves: Enabling Secure Collaboration over the Internet, 1996.*
Schneider, Virtual Environment for Education, Research and Life, 1996.*
Willebeek–Lemair M H Et Al., vol. 20, No. 3, May 1, 1997, pp. 157–168.

*Primary Examiner*—Mark H. Rinehart
*Assistant Examiner*—Thong Vu
(74) *Attorney, Agent, or Firm*—Blakely Sokoloff Taylor & Zafman

(57) ABSTRACT

A method and apparatus for dynamic loading of a transport mechanism is provided. A resource locator (RL) corresponding to a collaboration session is requested from a registry. A location indicator to the RL in the registry is received. In response to receiving the location indicator to the RL in the registry, a transportation mechanism specified in the first RL is dynamically loaded, and the collaboration session is joined. Thus, users wishing to collaborate use the registry to determine the type of transport mechanism they need to dynamically load to communicate with each other.

36 Claims, 5 Drawing Sheets

U.S. PATENT DOCUMENTS

| | | | | |
|---|---|---|---|---|
| 5,548,723 A | * | 8/1996 | Pettus | 709/200 |
| 5,724,508 A | * | 3/1998 | Harple, Jr. et al. | 709/205 |
| 5,754,765 A | * | 5/1998 | Danneels et al. | 709/222 |
| 5,764,906 A | * | 6/1998 | Edelstein et al. | 709/219 |
| 5,793,365 A | * | 8/1998 | Tang et al. | 345/329 |
| 5,809,237 A | * | 9/1998 | Watts et al | 709/202 |
| 5,826,027 A | * | 10/1998 | Pedersen et al. | 709/221 |
| 5,835,724 A | * | 11/1998 | Smith | 709/227 |
| 5,852,807 A | * | 12/1998 | Skarbo et al. | 705/7 |
| 5,862,330 A | * | 1/1999 | Anupam et al. | 709/204 |
| 5,864,668 A | * | 1/1999 | Andert et al. | 709/203 |
| 5,867,653 A | * | 2/1999 | Aras et al. | 709/204 |
| 5,869,819 A | * | 2/1999 | Knowles et al. | 235/375 |
| 5,870,559 A | * | 2/1999 | Leshem et al. | 709/224 |
| 5,870,562 A | * | 2/1999 | Butman et al. | 709/238 |
| 5,874,954 A | * | 2/1999 | Kilmer et al. | 345/333 |
| 5,884,033 A | * | 3/1999 | Duvall et al. | 709/206 |
| 5,897,622 A | * | 4/1999 | Blinn et al. | 705/26 |
| 5,903,754 A | * | 5/1999 | Pearson | 709/300 |
| 5,918,010 A | * | 6/1999 | Appleman et al. | 709/203 |
| 5,941,945 A | * | 8/1999 | Aditham et al. | 709/205 |
| 5,944,791 A | * | 8/1999 | Scherpbier | 709/218 |
| 5,956,509 A | * | 9/1999 | Kevner | 709/330 |
| 6,020,915 A | * | 2/2000 | Bruno et al. | 348/15 |
| 6,023,698 A | * | 2/2000 | Lavey, Jr. et al. | 707/10 |
| 6,058,393 A | * | 5/2000 | Meier et al. | 707/10 |
| 6,138,144 A | * | 10/2000 | DeSimon et al. | 709/202 |
| 6,343,313 B1 | * | 1/2002 | Salesky et al. | 709/204 |

* cited by examiner

METHOD AND APPARATUS FOR DYNAMIC LOADING OF A TRANSPORT MECHANISM IN A MULTIPOINT DATA DELIVERY SYSTEM

FIELD OF THE INVENTION

The present invention relates to multipoint data delivery systems, and more specifically, to transport mechanisms in a multipoint data delivery system.

BACKGROUND OF THE INVENTION

As computers become more important for business and entertainment, communication between computer users needs to be improved. One important function of computers is to distribute information to users and allow users to interact and collaborate. Prior art systems for distributing information and interaction include electronic mail (e-mail), mailing lists, making information available through a bulletin board system or a world wide web page, and video conferencing.

Electronic mail permits a user to send out information to a plurality of recipients. However, responses to e-mail are not easily collected. Additionally, multiple parties can not easily collaborate using e-mail.

Mailing lists are useful for distributing information, but it is relatively difficult to tailor what information is received by a subscriber. Additionally, if replies are allowed, the mailing list may become overly cumbersome.

A bulletin board system or world wide web page is useful to publish information. However, generally users can not easily alter the information displayed. Thus, this environment, while allowing publication, does not permit full collaboration between users.

Video conferencing, and similar methods, may be used to collaborate on specific projects. However, video conferencing generally requires a dedicated computer system, which can not be used for something else during the video conference. Furthermore, generally video conference participation is typically limited due to the amount of processing power and network bandwidth required to host each participant. Therefore, the number of participants in such conferences is significantly limited. Thus, it is relatively difficult to have a long term collaboration between multiple users via a video conferencing system.

When collaborations occur between multiple users using computers on different networks, different networking protocols may be present. This generally requires multiple versions of software to be written, one version for each specific protocol. Therefore, it would be advantageous to have an improved mechanism for collaboration which is also independent of the underlying network protocols.

SUMMARY OF THE INVENTION

The present invention is a method and apparatus for dynamically loading a transport mechanism in a multipoint data delivery system. A multi-point data delivery system provides a communication mechanism between users or a computer system which permits sending messages point to point, and point to multiple points. A resource locator (RL) corresponding to a collaboration session is requested from a registry. A location indicator of the RL in the registry is received from the registry. In response to receiving the location indicator of the RL in the registry, a transportation mechanism specified in the RL is dynamically loaded, and the collaboration session is joined. The transportation mechanism is a protocol stack identifying the transportation protocol used. The transportation protocols may include transmission control protocol (TCP), user datagrams protocol (UDP), remote method invocation (RMI), T.120, Common Object Request Broker Architecture (CORBA), Scaleable Reliable Multicast (SRM), and other transportation level implementations.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for dynamic loading of a transport mechanism in a multipoint data delivery system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
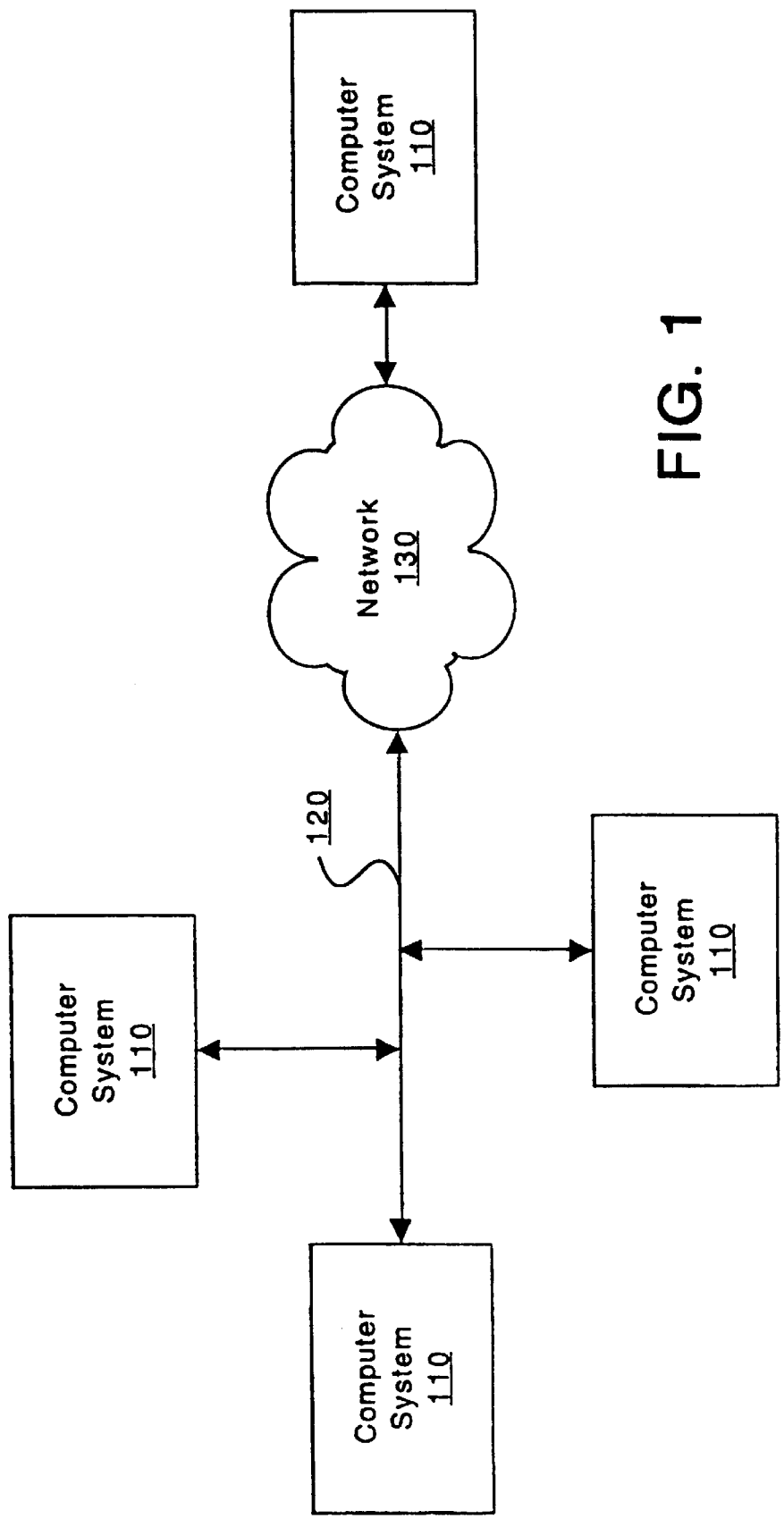
FIG. 1 is a block diagram illustrating one embodiment of a computer network in which the present invention may be implemented.

FIG. 1 is a block diagram illustrating one embodiment of a computer network on which the present invention may be implemented. Computer systems 110 are coupled to other computer systems 110 either directly, using direct connection 120, or through a network 130. In one embodiment, one or more of the computer systems 110 may be "clients" of a "session" conducted on another computer system 110. These terms are defined below. Alternately, one computer system 110 may act as the server, while the other computer systems 110 are clients. Alternately, the present invention may be implemented as a distributed system, having parts on more than one computer system. In an alternative embodiment, the present invention may be implemented on a single computer system 110.

The present invention is related to dynamically loading a transportation protocol in a collaboration system in a computer network. According to one embodiment, a collaboration system is managed by computer system in response to a processor executing sequences of instructions contained in memory. Execution of the sequences of instructions causes the computer network to establish a collaboration session, add new sessions, and dynamically load transportation protocol in order to permit a user to join a collaboration session, as will be described hereafter. In alternative embodiments, circuit logic internal to a computer network may be used in place of or in combination with software to implement the present invention. Thus, the present invention is not limited to any specific combination of hardware and software.

It is to be understood that although the term resource locator (RL) is used in the specification, alternate methods of specifying an object on the Internet may be utilized without changing the spirit of the present invention. Additionally, within an RL type, alternative access schemes or protocols may be utilized. Thus an RL corresponding to file transfer protocol (ftp), telnet, etc. may be utilized. However, for simplicity's sake, the term RL will be utilized henceforth.

Figure 2:
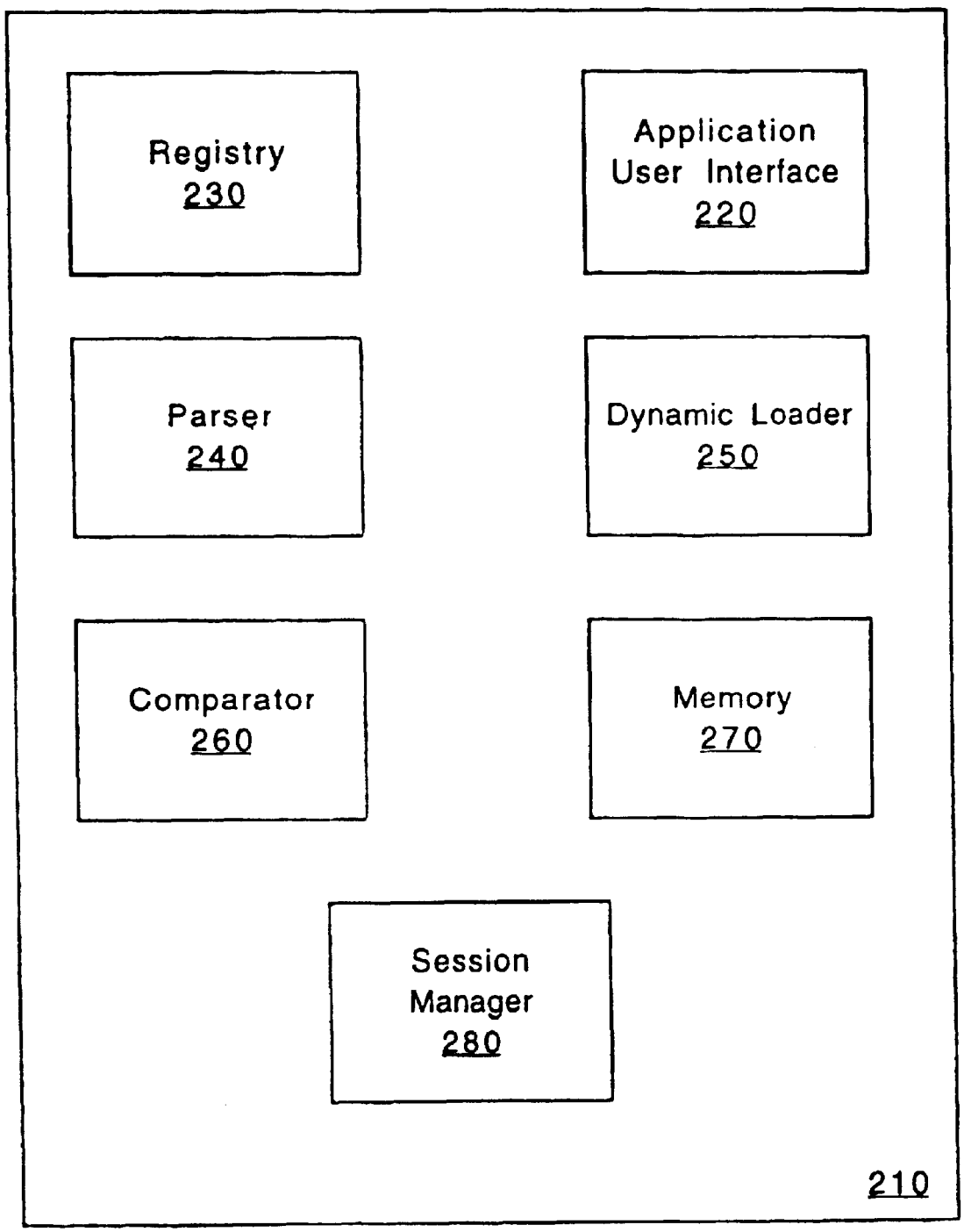
FIG. 2 is an overview diagram of one embodiment of the present invention.

FIG. 2 is a block diagram illustrating one embodiment of the collaboration system of the present invention. The collaboration system 210 of the present invention may be implemented on one or more computer systems 110. The collaboration system 210 includes elements which are implemented on a server computer and on a client computer. The server and client computers may however be the same computer.

An application user interface 220 is an interface which displays information to the clients/users and receives information from them. In one embodiment, the interface 220 may be a part of a world wide web browser application. The application user interface 220 is on the computer which acts as the client. collaboration system 210 further includes a registry 230. The registry 230 contains information pertaining to the remote sessions and clients, permitting other computer systems to link to various sessions and become clients, as will be described below. In one embodiment, the registry 230 is a bootstrap name server. In one embodiment, the registry 230 is implemented on the computer which acts as the server.

The collaboration system 210 further includes a parser 240. The parser 240 is for parsing a received resource locator (RL). In one embodiment, the resource locator is a uniform resource locator (URL). The parser 240 divides the RL into its component parts for further processing, as will be described below. The parser 240 is implemented on the client computer.

A dynamic loader 250 is a part of the collaboration system 210. The dynamic loader is for dynamically (i.e. automatically) loading a protocol stack, stored in the memory 270. The dynamic loader 250 loads a protocol stack in response to an RL which designates a type of protocol to be used for a new session/client being established. The dynamic loader 250 receives the type designation from the registry 230, determines the appropriate protocol stack to be loaded for the type and retrieves the protocol stack from the memory 270. Thus, the dynamic loader 250 dynamically loads the appropriate protocol stack in response to receiving a type designation. In one embodiment, the dynamic loader 250 is implemented on the client computer.

A comparator 260 compares a received RL to RLs in the registry 230. The comparator 260 determines whether the received RL is already in the registry 230. The comparator 260 determines whether the RL needs to establish a new session, or join an already established session which is in the registry 220. The comparator 260 outputs a determination whether a matching RL was found in the memory 270 associated with the registry 230. The comparator 260 is implemented on the server computer.

Figure 3:
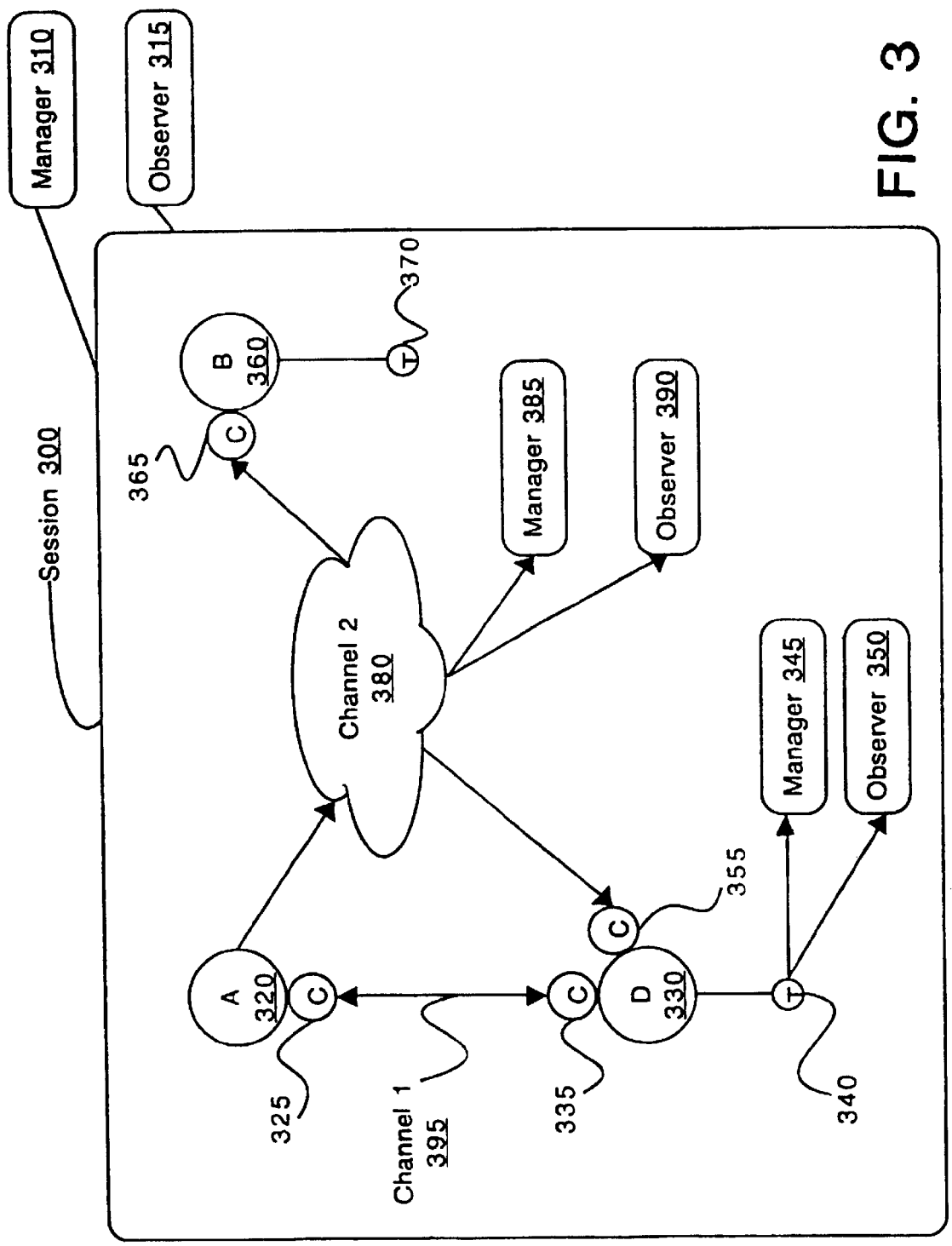
FIG. 3 is a block diagram illustrating an example of a session.

Session manager 280 manages each of the established sessions. Each established session has an RL in the registry 220 and at least one client. One example of a session is illustrated in FIG. 3. A session manager 280 is implemented on the computer which acts as the server for the particular session in question. For one embodiment, the server for a session need not be implemented on the same computer as the registry 230.

FIG. 3 illustrates an overview of a session 300 for collaborative computing. It permits multiple people to share an application. This session 300 may be for example, an on-line chat program, a shared white board, a gaming system, etc.

Session 300 is a collection of related Clients 320, 330, 360 which can exchange messages via defined communications paths 380, 395. Clients 320, 330, 360 are actual or potential participants in an instance of multi-party communications. Once properly associated with one another in a Session 300, related Clients 320, 330, 360 can transfer data in a point-to-point or multipoint fashion. The Session 300 maintains the state associated with the collection of clients 320, 330, 360 and their associated communications paths 380, 395, and may interact with an object which encapsulates a defined session management policy, manager 310.

A Channel 380, 395 is a specific instance of a potentially multi-party communications path between two or more Clients 320, 330, 360 within a given Session 300. A channel 380 may be shared between multiple clients 320, 330, 360, and two clients 320, 330 may establish a separate channel 395. All Client objects 320, 330, 360 which register an interest in receiving messages from a given Channel 380, will get messages sent on that Channel 380. Any Client 320 which possesses an object reference to a Channel 380, 395 is able to send a message on the given Channel 380, 395, and a Client 320 can have references to multiple Channels 380, 395. Thus, for example, Channel 380 for multi-party communications can be separate from Channel 395 for communication between two Clients 320, 330.

A Consumer 325, 335, 355, 365 is a Client object which has registered its interest in receiving messages sent over a given Channel 380, 395. Any Client 320, 330, 360 can be a Consumer 325, 335, 355, 365 and it is possible for a given Client 330 to be a Consumer 335, 355 of multiple Channels 380, 395 a the same time. A Client 320, 330, 360 sets a Consumer 325, 335, 355, 365 on a Channel 380, 395 to receive Data sent over that Channel 380, 395. The Data contains the raw data, plus the senders name, the priority of the Data that was sent and the name of the Channel 380, 395 the Data was sent over.

An Observer 315, 350, 390 is an object that has registered its interest in being notified about changes in a state of another object. An Observer 315, 350, 390 can observe changes in a Session 300, on a Channel 380 or a Token 340. A Session Observer 315 will be notified about Clients 320, 330, 360 joining and leaving a Session 300. A Channel Observer 390 will be notified about Clients 320, 330, 360 joining, leaving, being invited to join, and being expelled from a Channel 380, 395. A Token Observer 350 will be notified about Clients 320, 330, 360 joining, leaving, being invited to join, or expelled from a Token 340. The Token Observer 350 is also notified when a Client 320, 330, 360 wishes to give or take a Token 340 from another Client 320, 330, 360.

A Manager 310, 345, 385 encapsulates some management policy for another given object. Access to a Session 300, Channel 380 or Token 340 can be controlled by assigning a Manager 310, 345, 385 to it at creation time. The Manager 310, 345, 385 authenticates Clients 320, 330, 360 wishing to join this resource, and based upon their response accepts or rejects them. Both send and receive access to individual Channels 395 can be controlled by a private channel mechanism. Any Client 320, 330, 360 may convene a private Channel 395 which results in the Client 320, 330, 360 becoming the private Channel Manager 385 of an empty channel. The Channel Manager 385 can invite a Client 320, 330, 360 to join the Channel 380 or force a Client 320, 330, 360 to leave.

A Token 340, 370 is a synchronization object which provides a unique distributed atomic operation. Tokens 340, 370 can be used to implement a variety of different application-level synchronization mechanisms, for example to ensure mutually exclusive access to a shared resource. Tokens 340, 370 provide a means to implement exclusive access. For example, to ensure in a multipoint application using resources that one and only one site holds a given resource at a given time, a Token 340, 370 can be associated with every resource. When a site wishes to use a specific resource, it must ask for its corresponding Token 340, 370, which will be granted only if no one else is holding it. A single Token 340, 370 may be used to coordinate a multiple client event by having each Client 320, 330, 360 take the Token 340, 370 in a non-exclusive mode. Clients 320, 330, 360 can independently inhibit and release the same Token 340, 370. For example, if it was desired to know when all Clients 320, 330, 360 have completed reception and processing of a bulk file transfer, all receiving Client 320, 330, 360 would non-exclusively grab (inhibit) the same Token 340, 370 and each individual Client 320, 330, 360 would release the Token 340, 370 when it had completed the proscribed process. Any Client 320, 330, 360 could test the token 340, 370 at will to determine if the token 340, 370. is free which means all the Clients 320, 330, 360 have completed processing.

Operation Example

Within a multipoint Session 300 a Client 320, 330, 360 can send data to different members of the Session 300 and have access to tokens 340, 370 for resource contention resolution. This example will be explained with respect to Client D 330. However, it is to be understood that the explanation provided applies to any other client which joins a session. The first thing a Client 330 has to do is join a Session 300. The Client 330 first determines what sessions are available to it.

The Client 330 then joins a Session 300, or multiple sessions. The Session will typically have multiple Clients 320, 330, 360, either at the same site or at different sites. An application or applet can have multiple Clients 320, 330, 360 in the same Session 300. An applet is a platform independent program written in Sun Microsystem™'s Java™* language which can be distributed as an attachment in a World-Wide Web document and executed by a web browser. Each Client 320, 330, 360 might be handling a different kind of data, i.e. audio vs. video. A Client 330 can also be a member of multiple Sessions.

* Sun, Sun Microsystems, the Sun logo, and Java are registered trademarks of Sun Microsystems Inc. in the United States, and other countries.

Once the Session 300 is established, and the Client 330 has joined the Session 300, the Client 330 joins the appropriate Channels 380, 395 it requires for receiving data. The use of these Channels 380, 395 is application dependent. Tokens 340, 370 are also provided for managing a resource available to the client. Channels 380, 395 are session-wide addresses. Every Client 320, 330, 360 of a Session 300 can join a Channel 380, 395 to receive data sent to it, and by joining an appropriate combination of Channels 380, 395, and by consuming them, a Client 330 can choose to receive messages sent to these Channels 380, 395 and ignore messages sent to other Channels. The Client 330 subscribe to and leave the desired Channels 380, 395 with the join and leave Channel methods.

Once the participating Clients 320, 330, 360 have attached to the common Session 300 and joined the right combination of Channels 380, 395, they are ready to exchange data in a true multipoint fashion.

Figure 4:
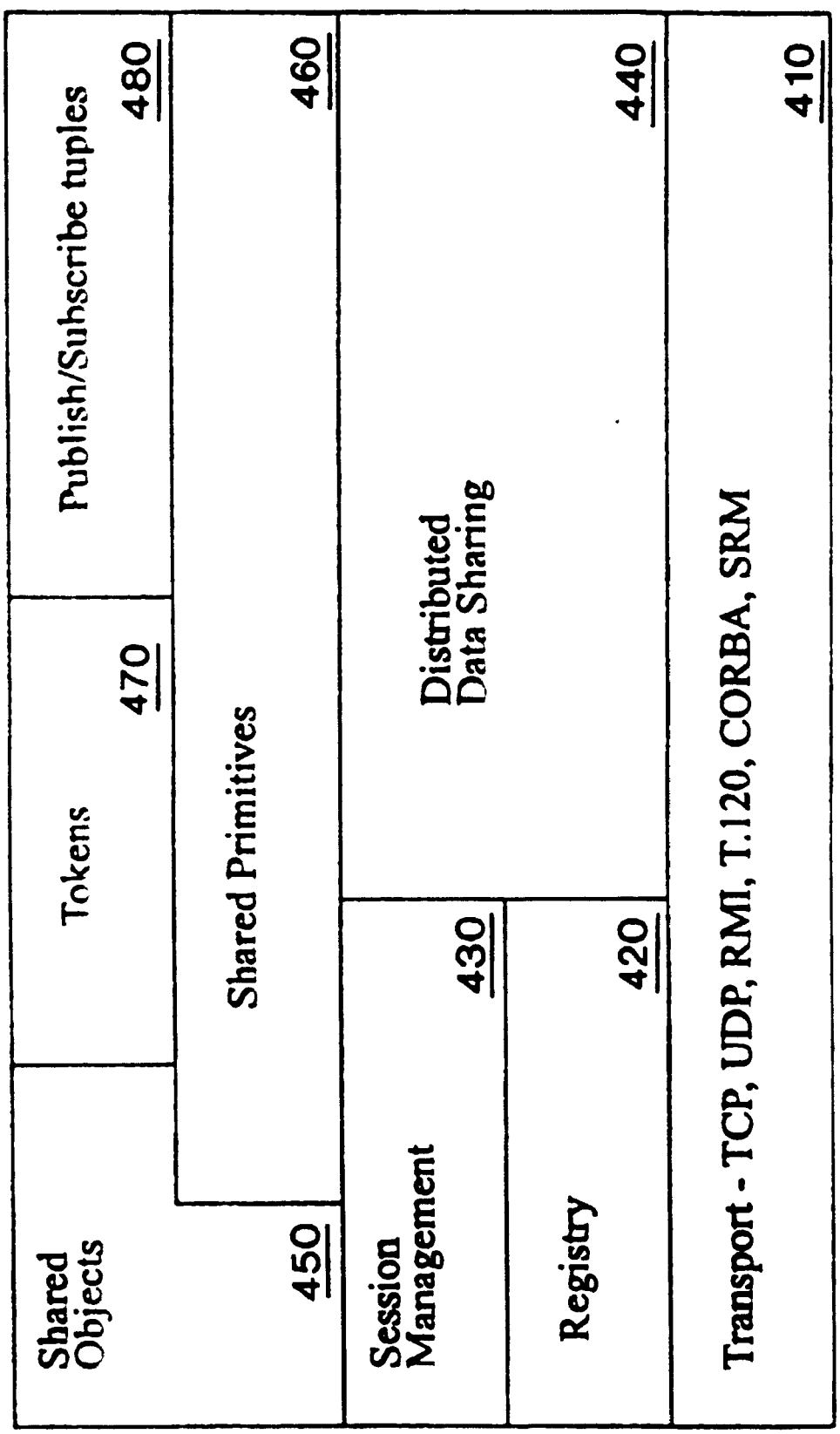
FIG. 4 is a block diagram illustrating one embodiment of the overall application interface.

FIG. 4 is a block diagram illustrating the various levels of interactions within a collaboration environment. The lowest level is the transport level 410. The transport level 410 is utilized to interface with the network, and may include transmission control protocol (TCP), user datagrams protocol (UDP), remote method invocation (RMI), T.120, Common Object Request Broker Architecture (CORBA), Scaleable Reliable Multicast (SRM), and other transportation level 410 implementations.

A registry 420 is one level above the transport level 410. The registry 420 resides on the computer system which acts as the server and is used to keep track of all current sessions and clients. In one embodiment, the registry 420 is a bootstrap name server which allows a user to obtain remote sessions on a given host. The registry 420 is, in effect, a record which contains a list of all available sessions and clients. Above the registry 420 is the session management 430. The session management 430 acts as a manager of each individual session which is in progress. Each session has a separate management block, and all of these management blocks together form the session management 430.

At the same level as the registry is the distributed data sharing 440. The distributed data sharing 440 permits the various types of data objects to be shared between a number of clients. The data sharing 440 permits the sharing of the shared objects 450, shared primitives 460, tokens 470, and publish/subscribe tuples 480. The distributed data sharing 440 also contains the Channels and data sending and receiving software.

Shared objects 450 reside above the session management 430. The shared objects 450 include sessions, channels, data, tokens, observers, consumers, managers, and primitives. All of the data associated with these objects may be shared by using the data sharing 440. For one embodiment the Shared Objects 450 also allow objects to be shared outside the multipoint collaborative environment.

Shared primitives 460 reside above the distributed data sharing 440 and session management 430. Shared primitives 460 are used to create and update simple named data elements which are shared between the members of a session. They may include boolean, double, float, integer, long, and string. Shared primitives 460 always have an up-to-date internal value.

Tokens 470 reside above the shared primitives 460. Tokens 470 provide a means to implement exclusive access to shared resources. Tokens 470 are associated with such a resource. When a site wishes to use a specific resource, it must request its token, which will be granted only if no one else is holding the token. Tokens 470 are also used to coordinate a multiple client event, by having non-exclusive tokens, which may be shared by multiple clients at the same time.

Publish/subscribe tuples 480 reside above the shared primitives 460. Publish/subscribe tuples 480 are associated with every client. The publish/subscribe tuples 480 permit a client to publish something on the collaboration system, and to subscribe to publications of others.

Figure 5:
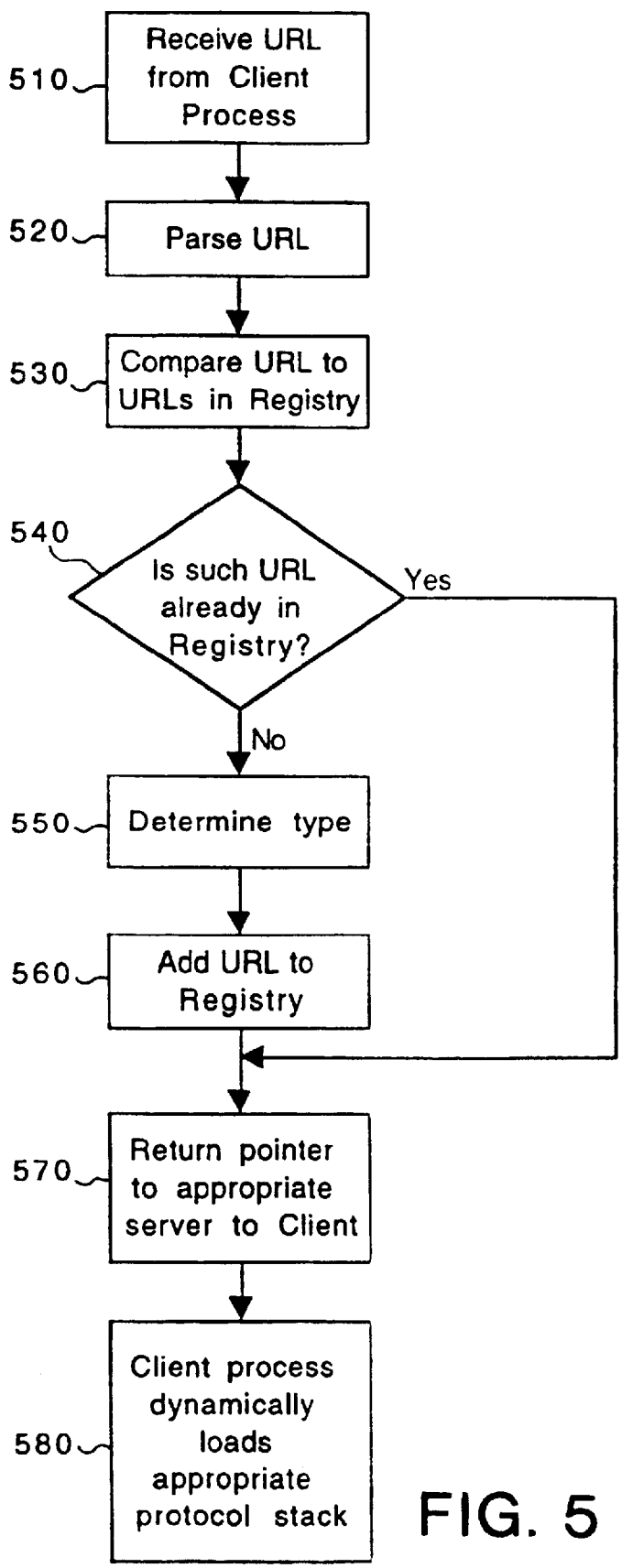
FIG. 5 is a flowchart illustrating one method of dynamically loading the transport mechanism.

FIG. 5 is a flowchart illustrating the flow of joining or registering a session with the registry 420. At block 510 a universal resource locator (RL) is received from a client. In one embodiment, the resource locator, is in the following form:

coll://<host>:<port>/<type>/Session/<session_name> or coll://<host>:<port>/<type>/Client/<client_name>where the information in brackets "< >" is substituted by the actual name. Host:port designates the location of the designated server for this particular collaboration. The host indicates the name of the host computer. The port indicates the port number of the computer on which the present session or client is to be established. The type designates the type of connection used for the collaboration, including, for example, TCP, UDP, RMI, T.120, CORBA, SRM, and other transportation types. The Session or Client determines whether the RL is referencing a Session or a Client. The session name and client name are self-explanatory.

At block 520, the RL is parsed. Parsing the RL separates the elements described above, in order to analyze the RL.

At block 530, the received RL is compared to the RLs in the Registry. Each established session has an RL which is stored in the Registry, in order to permit other users to connect to the same session. Thus, each element of the RL is compared to the RLs in the Registry.

At block 540, the process determines whether such the received RL is identical to an RL in the Registry. If the RL is already in the registry, the process continues directly to block 570. Otherwise, the process continues to block 550.

At block 550, the type of transportation mechanism specified in the RL is determined. That is, the type specified, such as TCP, UDP, RMI, T.120, CORBA, SRM, is identified. Thus, for example, in an RL such as coll://stard.Eng:4461/TCP/Session/ChatSession/ the type is "TCP".

At block 560, the new RL is added to the registry. Adding the RL to the registry allows later users/clients to register to join the collaborative session. The registry 220 may have sessions with different transport mechanism.

At block 570, a location indicator indicating the location of the established session is returned to the user. In one embodiment, the location indicator is a pointer to the RL in the registry. In another embodiment, the location indicator is an Internet address. In one embodiment, the session is established on the same server that the registry is located on. Alternatively, the session may be established on a different computer, as indicated by the RL.

At block 580, the client, in response to receiving the location indicator, dynamically loads the object class, and the appropriate protocol stack. In one embodiment, the object class is a SharedData class. Each type of transport mechanism has a protocol stack, a layered set of protocols which work together to provide a set of network functions. The protocol stack may follow the International Standards Organization's seven layer model. Each client in the multi-point collaborative system has available at,least one protocol stack. In response to receiving the RL location indicator, the dynamic loader 250 of the client loads the appropriate protocol stack, enabling the client to communicate with the session. In one embodiment, the protocol stack is loaded automatically, which means that a client or user need not interact with the present system in order to select a new protocol.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims and their equivalents.

What is claimed is:

1. A method of accessing a collaboration session by a client comprising:

requesting access to the collaboration session by sending a resource locator (RL) to a session manager;

receiving a location indicator from a stored resource locator in a registry;

in response to receiving the location indicator, dynamically loading a transportation mechanism specified in the location indicator to provide a set of network functions; and accessing the collaboration session by using the transportation mechanism to establish a connection with the collaboration session.

2. The method of claim 1 wherein the step of dynamically loading the transportation mechanism further comprises:

creating a new instance of an object class corresponding to a type of the transportation mechanism;

retrieving a protocol stack corresponding to the transportation mechanism; and initiating the protocol stack.

3. The method of claim 2 wherein the object class is a shared data class.

4. The method of claim 1 further comprising:

determining if the RL matches any one of a plurality of RLs in the registry; and if the RL does not match, adding the RL to the plurality of RLs in the registry.

5. The method of claim 1, wherein the RL further includes a host and a port identification, a session or client identification, and a session or client name.

6. The method of claim 1 further comprising dynamically assigning a client manager as the session manager at a creation of the collaboration session.

7. The method of claim 1 wherein each established collaboration session has a resource locator stored in the registry to permit client sessions to access the established collaboration sessions.

8. The method of claim 1 wherein the location indicator is a pointer to the stored resource locator in the registry.

9. The method of claim 1 wherein the transportation mechanism comprises a protocol stack and an object class that work together to provide the set of network functions.

10. An apparatus for facilitating a collaboration session among computer users comprising:

a session manager for facilitating the collaboration session;

a client process for requesting access to the collaboration session by sending a request locator (RL) to the session manager;

a parser coupled to the session manager for extracting a type designation from the RL; and a dynamic loader for loading a transportation mechanism corresponding to the type designation of the RL, said transportation mechanism providing a set of network functions that permit the client process to establish a connection with the collaboration session.

11. The apparatus of claim 10, wherein the type designation of the RL identifies a type of a transportation mechanism used for the collaboration session.

12. The apparatus of claim 11 wherein the transportation mechanism may be one of the following: transmission control protocol (TCP), user datagrams protocol (UDP), remote method invocation (RMI), T.120, Common Object Request Broker Architecture (CORBA), Scaleable Reliable Multicast (SRM).

13. The apparatus of claim 11, wherein the RL further includes a host and a port identification, a session or client identification, and a session or client name.

14. The method of claim 2 wherein the protocol stack is a layered set of protocols to provide a set of network functions to the collaboration session.

15. The apparatus of claim 10, further comprising a comparator for dynamically assigning a client manager as the session manager at the creation of the collaboration session.

16. The apparatus of claim 15 further comprising a distributed data sharing class for sharing data objects between clients.

17. The apparatus of claim 15 wherein the data objects are shared primitives, shared objects, tokens, and publish/subscribe tuples.

18. The apparatus of claim 10, further comprising:
   a registry logically connected to the session manager for maintaining a set of resource locators;
   a comparator for matching the RL to any one of the set of resource locators in the registry; and
   means for adding the RL to the set of resource locators if the RL does not match any one of the set of resource locators in the registry.

19. The apparatus of claim 10 wherein the transportation mechanism comprises a protocol stack and an object class that work together to provide the set of network functions.

20. A computer data signal embodied in a carrier wave and representing sequences of instructions which, when executed by a processor, cause said processor to access a collaboration session, said computer data signal comprising:
   a first computer program being executable to access the collaboration session by sending a resource locator (RL) to a session manager;
   a first operating system procedure being executable to receive a location indicator from a stored resource locator in registry; and
   a second computer program being executable to dynamically load a transportation mechanism corresponding to the location indicator, the transport mechanism to provide a set of network functions, and to establish a connection with the collaboration session by using the transportation mechanism.

21. The computer data signal of claim 20 wherein the second computer program further includes:
   a first subprogram being executable to create a new instance of an object class corresponding to a type of the transportation mechanism;
   a second subprogram being executable to retrieve a protocol stack corresponding to the transportation mechanism; and
   a third subprogram being executable to initiate the protocol stack.

22. The computer data signal of claim 20 wherein the transportation mechanism comprises a protocol stack and an object class that work together to provide the set of network functions.

23. A machine readable medium having stored thereon data representing sequences of instructions, which when executed by a computer system, cause said computer system to access a collaboration session, said sequences of instructions comprising:
   a first sequence for requesting access to the collaboration session by sending a resource locator (RL) to a session manager;
   a second sequence for receiving a location indicator from a stored resource locator in a registry;
   a third sequence for dynamically loading a transportation mechanism corresponding to the location indicator in response to receiving the location indicator, the transportation mechanism to provide a set of network functions; and
   a fourth sequence for establishing a connection to the collaboration session by using the transportation mechanism.

24. The machine readable medium of claim 23, wherein the third sequence further includes:
   a fifth sequence for creating a new instance of an object class corresponding to a type of the transportation mechanism;
   a sixth sequence for retrieving a protocol stack corresponding to the transportation mechanism; and
   a seventh sequence for initiating the protocol stack.

25. The medium of claim 24 wherein the object class is a shared data class.

26. The medium of claim 24 wherein the protocol stack is a layered set of protocols to provide a set of network functions to the collaboration session.

27. The medium of claim 23 further comprising a fifth sequence for dynamically assigning a client manager as the session manager at the creation of the collaboration session.

28. The medium of claim 23 wherein each established collaboration session has a resource locator stored in the registry to permit client sessions to access the established collaboration sessions.

29. The medium of claim 23 wherein the location indicator is a pointer to the stored resource locator in the registry.

30. The machine readable medium of claim 23 wherein the transportation mechanism comprises a protocol stack and an object class that work together to provide the set of network functions.

31. A system for accessing a collaboration session comprising:
   means for requesting access to the collaboration session by sending a resource locator (RL) to a session manager;
   means for receiving a location indicator from a stored RL in a registry;
   in response to receiving the location indicator, means for dynamically loading a transportation mechanism corresponding to the location indicator, the transport mechanism providing a set of network functions; and
   means for establishing a connection with the collaboration session by using the transportation mechanism.

32. The system of claim 31 further comprising means for dynamically assigning a client manager as the session manager at the creation of the collaboration session.

33. The system of claim 31 wherein the means for dynamically loading the transportation mechanism further comprises:
   means for creating a new instance of an object class corresponding to a type of the transportation mechanism;
   means for retrieving a protocol stack corresponding to the transportation mechanism; and
   means for initiating the protocol stack.

34. The system of claim 31 further comprising:
   means for determining if the RL matches any one of a plurality of resource locators in the registry; and
   if the RL does not match, means for adding the RL to the plurality of resource locators in the registry.

35. The system of claim 31 wherein the transportation mechanism comprises a protocol stack and an object class that work together to provide the set of network functions.

36. A method of accessing a collaboration session by a client comprising:

requesting access to the collaboration session by sending a resource locator (RL) to a session manager;

receiving a location indicator from a stored resource locator in a registry;

in response to receiving the location indicator, dynamically loading a transportation mechanism specified in the location indicator to provide a set of network functions; and connecting to the collaboration session by using the transportation mechanism, wherein the transportation mechanism comprises a protocol stack and an object class that work together to provide the set of network functions.

* * * * *